US012369232B2

(12) United States Patent
Parachini et al.

(10) Patent No.: US 12,369,232 B2
(45) Date of Patent: Jul. 22, 2025

(54) INDUCTION COIL COMPRESSION APPARATUS FOR BEAM ASSEMBLY

(71) Applicant: WHIRLPOOL CORPORATION, Benton Harbor, MI (US)

(72) Inventors: Davide Parachini, Cassano Magnago (IT); Cristiano Vito Pastore, Camerio (IT)

(73) Assignee: Whirlpool Corporation, Benton Harbor, MI (US)

( * ) Notice: Subject to any disclaimer, the term of this patent is extended or adjusted under 35 U.S.C. 154(b) by 1325 days.

(21) Appl. No.: 16/356,214

(22) Filed: Mar. 18, 2019

(65) Prior Publication Data
US 2019/0297688 A1 Sep. 26, 2019

(30) Foreign Application Priority Data
Mar. 23, 2018 (EP) .................................... 18163808

(51) Int. Cl.
*H05B 6/12* (2006.01)
*F24C 7/06* (2006.01)
(Continued)

(52) U.S. Cl.
CPC ............. *H05B 6/1281* (2013.01); *F24C 7/06* (2013.01); *F24C 15/006* (2013.01);
(Continued)

(58) Field of Classification Search
CPC ............ H05B 2206/022; H05B 6/1245; H05B 6/1263; H05B 2213/07; F24C 7/06; F24C 15/006; F24C 15/104
See application file for complete search history.

(56) References Cited

U.S. PATENT DOCUMENTS 3,786,220 A   1/1974  Hamden, Jr.
4,029,926 A   6/1977  Austin
(Continued)

FOREIGN PATENT DOCUMENTS

CN   104039033 A   9/2014
CN   104303593 A   1/2015
(Continued)

OTHER PUBLICATIONS

TE connectivity (Year: 2017).*
Wuerth: Cantilever sensors mount on circuit boards website, 2009 (Year: 2009).*

*Primary Examiner* — Steven W Crabb
*Assistant Examiner* — Fahmida Ferdousi
(74) *Attorney, Agent, or Firm* — Price Heneveld LLP

(57) ABSTRACT

An induction cooking apparatus includes a panel forming a cooking surface and a bottom surface. The cooking surface is configured to support a cooking utensil. A housing is in connection with and disposed beneath the cooking surface. The housing forms an enclosure having an internal cavity. The enclosure includes a first side and a second side opposite the first side. A plurality of induction coils is arranged in at least one linear array beneath the cooking surface. A beam structure includes a first end portion and a second end portion. The beam structure is configured to extend across the housing of the cooking apparatus from the first side to the second side and support the plurality of induction coils. A plurality of spring mechanisms connects the first end portion to the first side and the second end portion to the second side.

20 Claims, 8 Drawing Sheets

(51) Int. Cl.
*F24C 15/00* (2006.01)
*F24C 15/10* (2006.01)
*H05B 1/02* (2006.01)

(52) U.S. Cl.
CPC ......... *F24C 15/104* (2013.01); *H05B 1/0266* (2013.01); *H05B 6/1209* (2013.01); *H05B 6/1245* (2013.01); *H05B 6/1254* (2013.01); *H05B 6/1263* (2013.01); *H05B 2206/022* (2013.01); *H05B 2213/03* (2013.01)

(56) References Cited

U.S. PATENT DOCUMENTS

| | | | |
|---|---|---|---|
| 4,045,654 | A | 8/1977 | Eide |
| 4,351,996 | A * | 9/1982 | Kondo ............... H05B 6/062 |
| | | | 219/448.13 |
| 4,415,788 | A | 11/1983 | Field |
| 4,431,892 | A | 2/1984 | White |
| 4,476,946 | A | 10/1984 | Smith |
| 4,776,980 | A | 10/1988 | Ruffini |
| 5,448,038 | A | 9/1995 | Kim |
| 5,665,263 | A | 9/1997 | Gaspard |
| 5,686,006 | A | 11/1997 | Gaspard |
| 5,866,884 | A | 2/1999 | Cornec et al. |
| 6,288,374 | B1 | 9/2001 | Eskildsen et al. |
| 7,009,151 | B2 * | 3/2006 | Lee ................. H05B 3/008 |
| | | | 219/451.1 |
| 7,057,144 | B2 | 6/2006 | Hirota et al. |
| 7,274,008 | B2 | 9/2007 | Arnal Valero et al. |
| 7,390,994 | B2 | 6/2008 | Oh et al. |
| 7,777,163 | B2 | 8/2010 | Hosoi et al. |
| 8,058,589 | B2 | 11/2011 | Cho |
| 8,203,106 | B2 | 6/2012 | Kataoka et al. |
| 8,440,944 | B2 | 5/2013 | Acero Acero et al. |
| 8,526,800 | B2 * | 9/2013 | Fritschie ............... H05B 3/06 |
| | | | 392/418 |
| 9,356,383 | B2 | 5/2016 | Waffenschmidt et al. |
| 9,370,051 | B2 | 6/2016 | Fossati et al. |
| 9,603,202 | B2 | 3/2017 | Shaw |
| 10,582,573 | B2 | 3/2020 | Hoare et al. |
| 2004/0245244 | A1 | 12/2004 | Hirota et al. |
| 2009/0020526 | A1 | 1/2009 | Roux |
| 2010/0044367 | A1 | 2/2010 | Kim et al. |
| 2010/0219179 | A1 | 9/2010 | Lin |
| 2012/0043312 | A1 | 2/2012 | Lee et al. |
| 2012/0223070 | A1 | 9/2012 | Matsui et al. |
| 2016/0135255 | A1 * | 5/2016 | Ogawa ............... H05B 6/1236 |
| | | | 219/624 |
| 2016/0295644 | A1 * | 10/2016 | Khokle ............... H05B 6/1263 |
| 2017/0079092 | A1 | 3/2017 | Falcon et al. |
| 2018/0168005 | A1 | 6/2018 | Yun |
| 2019/0297680 | A1 | 9/2019 | Parachini et al. |
| 2019/0297681 | A1 | 9/2019 | Parachini et al. |
| 2019/0297686 | A1 | 9/2019 | Parachini et al. |

FOREIGN PATENT DOCUMENTS

| | | | | |
|---|---|---|---|---|
| DE | 8329498 | U1 | 1/1984 | |
| DE | 102015227088 | A1 | 6/2006 | |
| DE | 102006038370 | A1 | 2/2008 | |
| DE | 202009000990 | U1 * | 4/2009 | ........ H05B 6/1245 |
| DE | 102010028549 | A1 | 11/2010 | |
| DE | 102015220795 | A1 | 6/2016 | |
| EP | 453634 | A2 | 10/1991 | |
| EP | 2028912 | A2 | 2/2009 | |
| EP | 1575336 | B1 | 1/2010 | |
| EP | 2498576 | A1 | 9/2012 | |
| EP | 2816869 | A1 | 12/2014 | |
| EP | 2975289 | A2 | 1/2015 | |
| EP | 2445309 | B1 | 5/2016 | |
| EP | 3267766 | A1 | 1/2018 | |
| EP | 3139702 | B2 | 11/2018 | |
| ES | 2328540 | B1 | 9/2010 | |
| FR | 2659725 | A1 | 9/1991 | |
| GB | 2389767 | A | 12/2003 | |
| JP | 2004349185 | A * | 12/2004 | |
| JP | 2008153046 | A | 7/2008 | |
| JP | 4932548 | B2 | 5/2012 | |
| JP | 2013175298 | A * | 9/2013 | |
| KR | 101710297 | B1 * | 3/2017 | |
| WO | 2006123855 | A1 | 11/2006 | |
| WO | WO-2011077332 | A1 * | 6/2011 | ............ H05B 6/12 |
| WO | 2011148289 | A2 | 12/2011 | |
| WO | 2016087297 | A1 | 6/2016 | |

\* cited by examiner

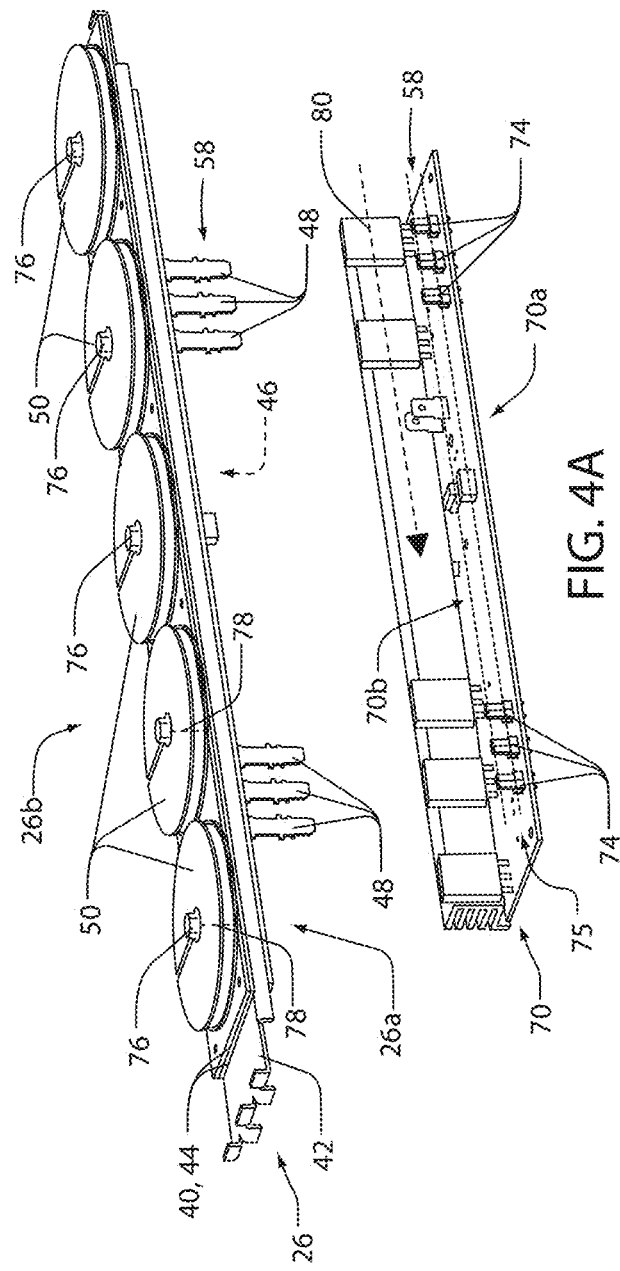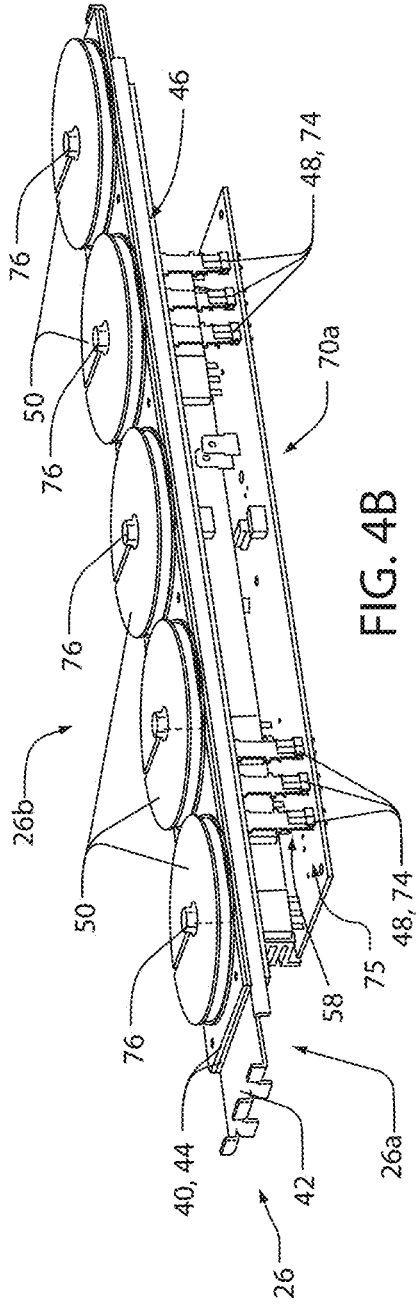

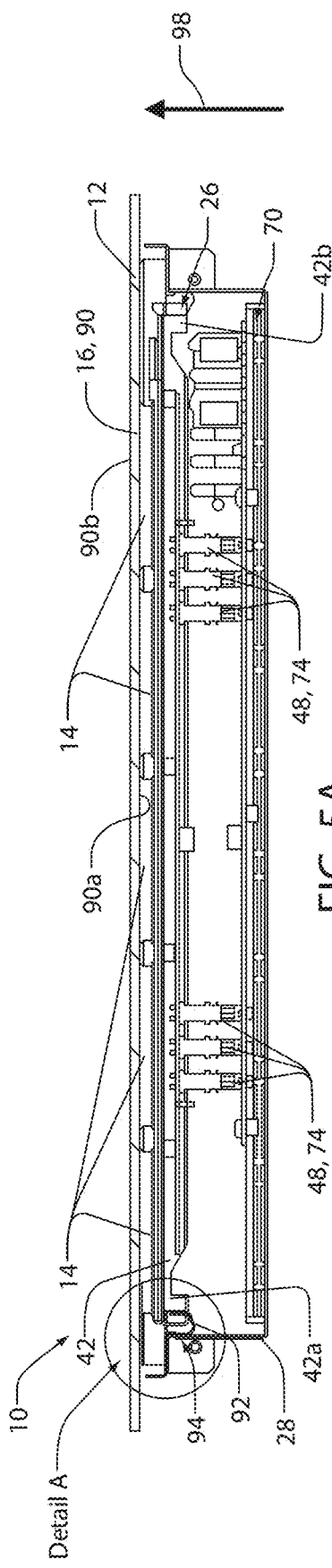
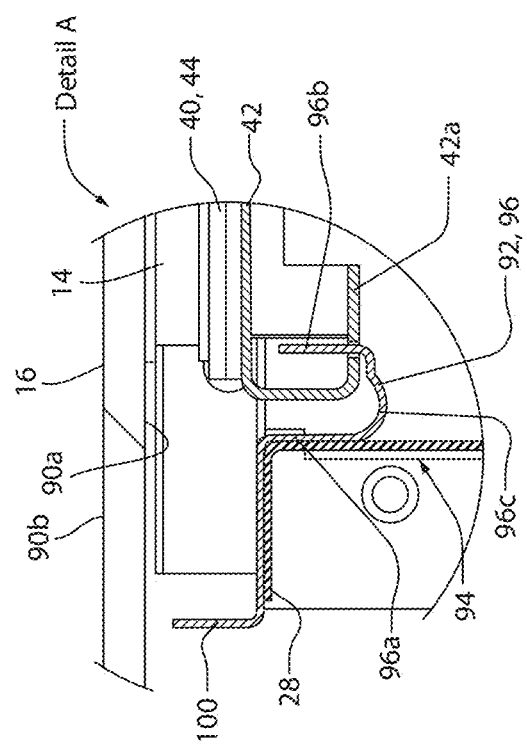
FIG. 5A
FIG. 5B

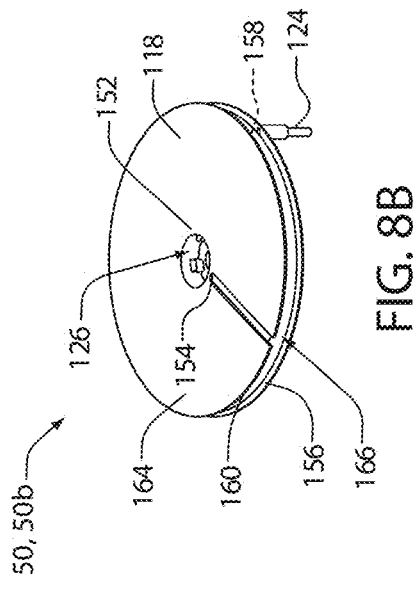
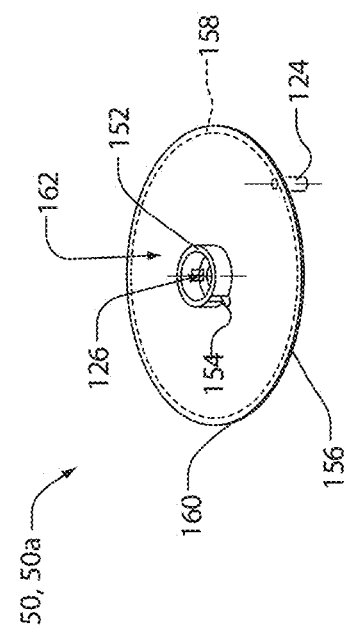

INDUCTION COIL COMPRESSION APPARATUS FOR BEAM ASSEMBLY

CROSS REFERENCE TO RELATED APPLICATION

The present application claims priority to European Patent Application No. 18163808.1, entitled INDUCTION COIL COMPRESSION APPARATUS FOR BEAM ASSEMBLY, which was filed on Mar. 23, 2018, now EP 3544375 issued May 8, 2024, the entire contents of which are hereby incorporated by reference.

Technological Field

The present invention relates to an induction cooktop and, and more specifically, to an induction cooktop assembly comprising a plurality of cooking zones.

BACKGROUND

Induction cooktops are devices which exploit the phenomenon of induction heating for food cooking purposes. The disclosure provides for a variety of improved assemblies for induction cooktops that may improve performance and/or economical manufacture. Such improvements may serve to improve the utilization of induction-based cooking technologies. Accordingly, the disclosure provides for assemblies, systems, and methods for induction cooktops.

SUMMARY

In at least one aspect of the present disclosure, an induction cooking apparatus is disclosed. The cooking apparatus comprises a panel forming a cooking surface and a bottom surface. The cooking surface is configured to support a cooking utensil. A housing is in connection with and disposed beneath the cooking surface. The housing forms an enclosure having an internal cavity. The enclosure comprises a first side and a second side opposite the first side. A plurality of induction coils is arranged in at least one linear array beneath the cooking surface. A beam structure comprises a first end portion and a second end portion. The beam structure is configured to extend across the housing of the cooking apparatus from the first side to the second side and support the plurality of induction coils. A plurality of spring mechanisms connects the first end portion to the first side and the second end portion to the second side. The above features, taken alone or in combination, allow having an induction hob where the inductors are pressed against the cover plate without using a plurality of helical springs, therefore making the assembly of the hob easier and quicker.

In another aspect of the present disclosure, an induction cooking apparatus comprises a panel forming a cooking surface and a bottom surface. The cooking surface is configured to support a cooking utensil. A housing is in connection with and disposed beneath the cooking surface. The housing forms an enclosure having an internal cavity. The enclosure comprises a first side and a second side opposite the first side. A plurality of induction coils is arranged in a linear array beneath the cooking surface. A beam structure comprises a first end portion and a second end portion. The beam structure is configured to extend across the housing of the cooking apparatus from the first side to the second side. The beam structure is configured to support the array of induction coils. A plurality of spring mechanisms connects the first end portion to the first side and the second end portion to the second side. The spring mechanisms suspend the beam structure and the plurality of induction coils in the enclosure.

In yet another aspect of the present disclosure, an induction cooking apparatus comprises a panel forming a cooking surface and a bottom surface. The cooking surface is configured to support a cooking utensil. A housing is in connection with and disposed beneath the cooking surface. The housing forms an enclosure having an internal cavity. The enclosure comprises a first side and a second side opposite the first side. At least one temperature sensor is adjacent the bottom surface of the panel. A beam structure extends across the housing of the cooking apparatus from the first side to the second side and supports at least one induction coil. A plurality of first spring mechanisms support the beam structure from the first side to the second side. A control circuit is in connection with the support beam and in communication with the induction coil and the temperature sensor. The control circuit comprises a second spring mechanism formed on the control circuit and wherein the second spring mechanism is in connection with the temperature sensor.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 4A is a projected exploded view of a coil beam assembly and an inverter assembly;

FIG. 4B is a projected view of a coil beam assembly and an inverter assembly in an assembled configuration;

FIG. 5A is a side schematic section view of the induction cooktop assembly of FIG. 1 showing a coil beam assembly in connection with a spring assembly;

FIG. 5B is detailed side schematic section view of the induction cooktop assembly of FIG. 1 showing a coil beam assembly in connection with a spring assembly for a support beam;

FIG. 8A is a projected view of an embodiment of a single wall coil former of a coil beam assembly; and FIG. 8B is a projected view of an embodiment of a double wall coil former of a coil beam assembly in accordance with the disclosure.

DETAILED DESCRIPTION OF EMBODIMENTS

For purposes of description herein the terms "upper," "lower," "right," "left," "rear," "front," "vertical," "horizontal," and derivatives thereof shall relate to the device as oriented in FIG. 5A. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Conventional induction cooktops comprise a top surface made of glass-ceramic material upon which cooking units are positioned (hereinafter "pans"). Induction cooktops operate by generating an electromagnetic field in a cooking region on the top surface. The electromagnetic field is generated by inductors comprising coils of copper wire, which are driven by an oscillating current. The electromagnetic field has the main effect of inducing a parasitic current inside a pan positioned in the cooking region. In order to efficiently heat in response to the electromagnetic field, the pan should be made of an electrically conductive ferromagnetic material. The parasitic current circulating in the pan produces heat by Joule effect dissipation; such heat is generated only within the pan and acts without directly heating the cooktop.

Induction cooktops have a better efficiency than electric cooktops. For example, heating cookware via induction provides for a greater fraction of the absorbed electric power to be converted into heat that heats the cookware. In operation, the presence of the cookware or pan on the cooktop causes the magnetic flux close to the pan itself resulting in power being transferred towards the pan. In particular, the present invention discloses induction coil arrangements and construction configurations for cooktops comprising a plurality of induction coils, which provide for cooking utensils to be heated substantially over the entire top surface, without any restriction as for the position thereof on the cooktop.

Figure 1:
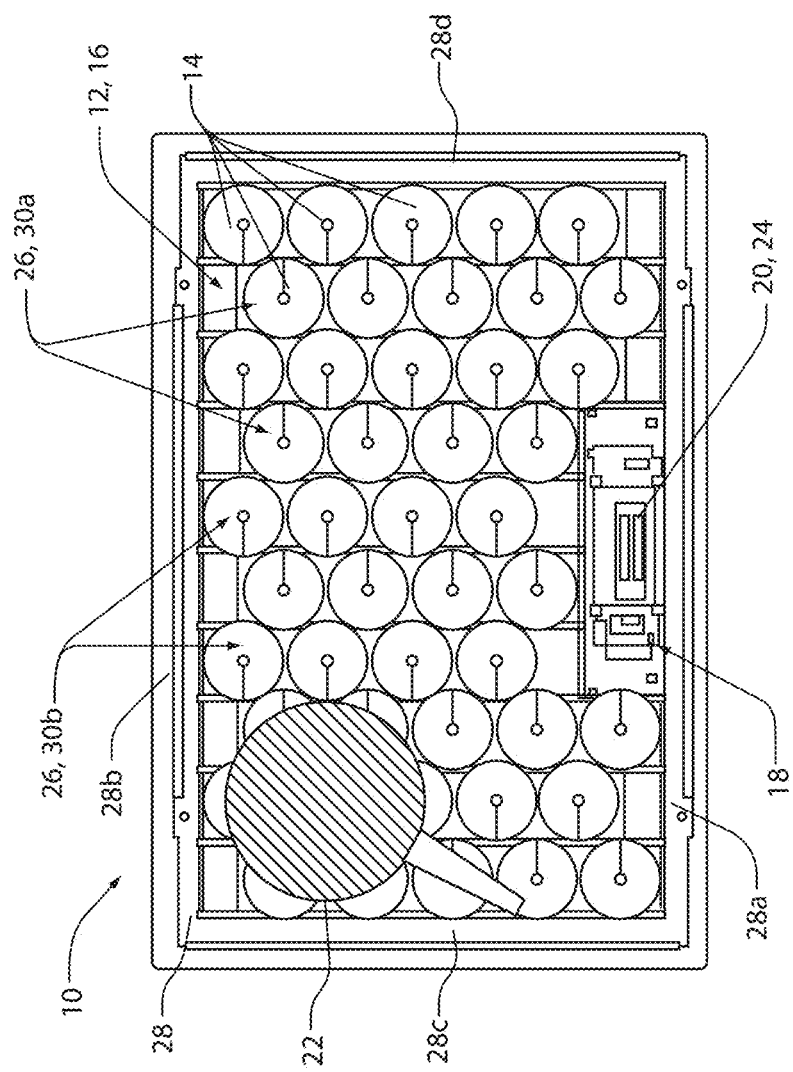
FIG. 1 is a top, plan view of an induction cooktop assembly where the upper glass ceramic plate has been removed for sake of clarity.

Referring to FIG. 1, a "flexible" induction cooktop assembly 10 is shown. In an exemplary embodiment, the induction cooktop assembly 10 may form an apparatus comprising an array 12 of induction coils 14 distributed over a cooking surface 16. The induction coils 14 may be in communication with a controller 18. The controller 18 may be configured to selectively activate the induction coils 14 in response to an input to a user interface 20. The controller 18 may correspond to a control system configured to activate one or more cooking regions formed by the induction coils 14 in response to an input or user selection. The induction coils 14 may comprise one or more driving circuits controlled by the controller 18. The driving circuits may comprise switching devices (e.g. solid state switches). The switching devices may be configured to generate variable frequency/variable amplitude current to feed the induction coils 14. In this configuration, the induction coils 14 may be driven such that an electromagnetic field is generated to heat a cooking utensil 22 (e.g. pans, pots, etc.).

In some embodiments, the induction coils 14 may be independently activated by the controller 18. The activation of the induction coils 14 may be in response to a user defined heat setting received via the user interface 20 in conjunction with a detection of a cooking utensil 22 on the cooking surface 16. In response to the user defined setting and the detection of the cooking utensil 22, the controller 18 may activate the induction coils 14 that are covered by the cooking utensil. Accordingly, the cooktop assembly 10 may provide for the cooking surface 16 to be selectively energized providing for a plurality of flexible cooking zones that may be referred to as "cook anywhere" functionality.

The user interface 20 may correspond to a touch interface configured to perform heat control and selection induction coils 14 for a cooking operation. The user interface 20 may comprise a plurality of sensors configured to detect the presence of a finger of an operator proximate thereto. The sensors of the user interface 20 may correspond to various forms of sensors. For example, the sensors of the user interface may correspond to capacitive, resistive, and/or optical sensors. In some embodiments, the user interface 20 may further comprise a display 24 configured to communicate at least one function of the cooktop 10. The display 24 may correspond to various forms of displays, for example, a light emitting diode (LED) display, a liquid crystal display (LCD), etc. In some embodiments, the display 24 may correspond to a segmented display configured to depict one or more alpha-numeric characters to communicate a cooking function of the cooktop 10. The display 24 may further be operable to communicate one or more error messages or status messages from the controller 18.

In some embodiments, the induction coils 14 may be grouped to form coil beam assemblies 26 or linear coil assemblies. Each of the induction coils 14 included on one of the coil beam assemblies 26 may comprise a plurality of the induction coils 14, which may be supported by one or more beams or beam structures extending laterally across a housing 28 or burner box of the cooktop 10 from a first wall 28a to a second wall 28b. The first wall 28a and the second wall 28b of the housing 28 may be arranged on opposite sides of the housing 28. In this configuration, the housing 28 may be substantially rectangular in form and further comprise a third side 28c and a fourth side 28d, which may extend parallel to the linear assemblies. Accordingly, the housing 28 may form an enclosure having an internal cavity configured to house various components of the cooktop 10.

As further discussed in reference to FIG. 1, the coil beam assemblies 26 may be arranged in an alternating, complementary arrangement comprising a plurality of neighboring columns 30 of the coil beam assemblies 26. For example, the neighboring columns 30 may be arranged such that each odd column 30a is rotated 180 degrees from each neighboring even column 30b. In this configuration, various components of the coil beam assemblies 26 may be favorably aligned providing for the coil beam assemblies 26 to position the induction coils 14 evenly spaced or distributed in the array 12. Such even spacing may provide for the induction coils 14 to evenly distribute energy over the cooking surface 16.

In some embodiments, the components and structure of one or more of the odd columns 30a and the even columns 30b may be the same. That is, one or more of the neighboring odd columns 30a and even columns 30b may comprise the same number of induction coils 14, the same control or electrical circuits, the same plasto-ferritic or magnetic foil 44, etc. In order to arrange the induction coils 14 for even spacing, the columns 30a and 30b may be positioned on the support beams 42 or beam structures orienting the induction coils in a staggered configuration for each coil beam assembly 26 when rotated 180 degrees. For example, the staggered configuration may orient the induction coils 14 such that a center of each of the induction coils 14 positioned on the odd column 30a is laterally aligned with a perimeter of each of the induction coils 14 positioned on the even column 30b. Various aspects of the complementary nature of the coil beam assemblies 26 and the related components that enable the operation of the assemblies 26 are discussed in greater detail in reference to the following figures. Though the assemblies 26 are discussed as columns, the elongated structures forming the assemblies 26 may be arranged as rows, diagonals, or various spatial orientations without departing from the present invention.

As discussed herein, the cooktop assembly 10 may comprise a variety of novel components, both structural and electrical, that may provide for improved economy as well as quality. From the particular aspects of a foil designs for the induction coils to structural configurations of one or more support structures, the invention provides for a variety of beneficial assemblies providing for improved performance of the cooktop assembly 10. Though the cooktop assembly 10 is discussed in reference to specific examples, various components of the devices and systems discussed herein may be flexibly implemented alone or in combination as well.

Figure 2:
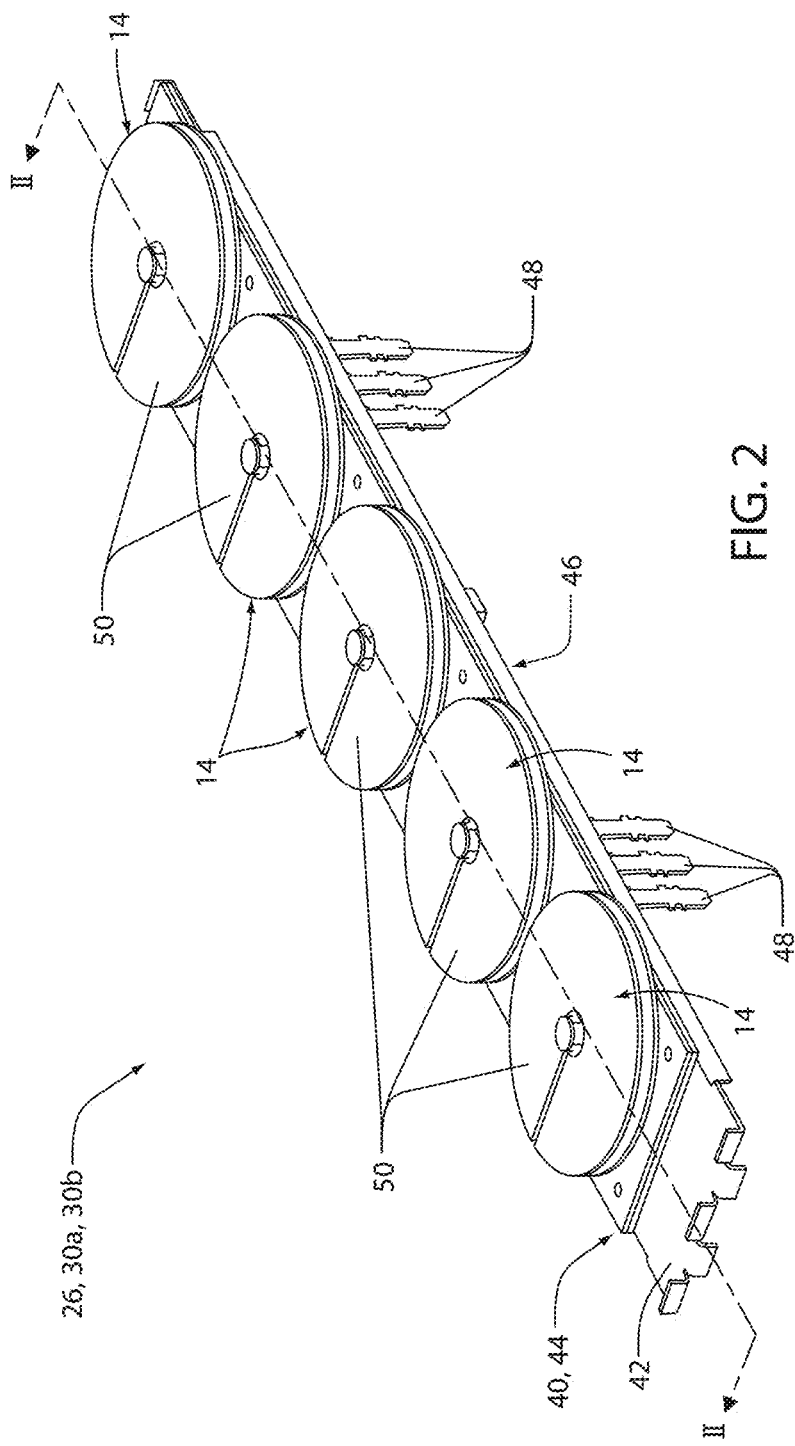
FIG. 2 is a projected view of a coil beam assembly used in the cooktop of FIG. 1.
Figure 3:
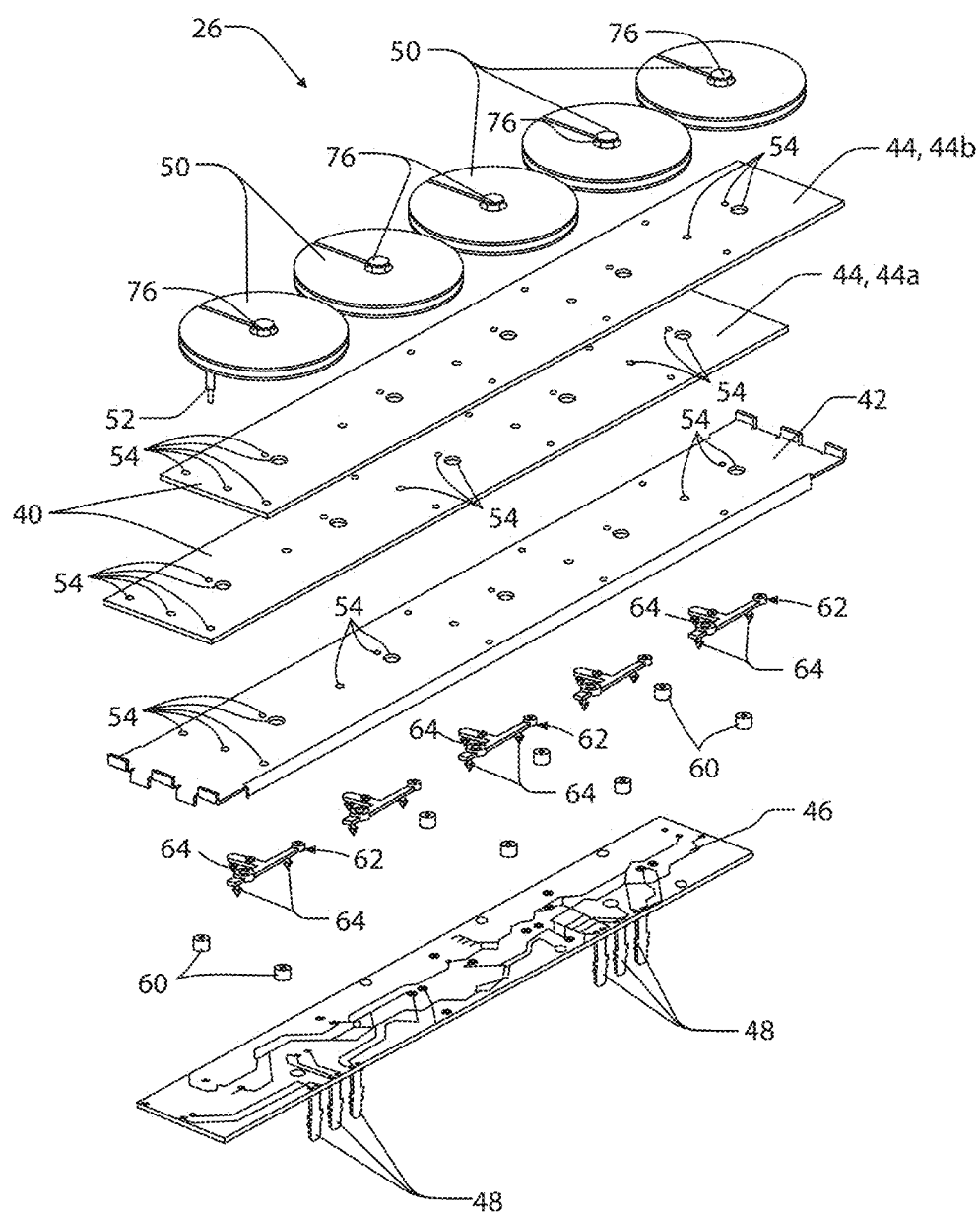
FIG. 3 is a projected exploded view of a coil beam assembly.

FIGS. 2 and 3 show an assembled schematic view and an exploded schematic view of an exemplary embodiment of the coil beam assembly 26. Referring now to FIGS. 1, 2, and 3, the cooktop assembly 10 may comprise one or more foil structures 40. The foil structures 40 may be formed of one or more polymeric materials, which may comprise a ferrite material dispersed or molded therein forming a plasto-ferritic structure. The foil structures 40 may be supported by support metal or polymer/composite beams 42 configured to support the coil beam assemblies 26 and extend from the first wall 28a to the second wall 28b of the housing 28. As previously discussed, the coil beam assemblies 26 may extend in complementary parallel groups beneath the cooking surface 16. Accordingly, each of the coil beam assemblies 26 may comprise one or more of the foil structures 40 extending continuously or uninterrupted under two or more of the induction coils 14 extending along a length of the beams 42. The foil structures 40 may correspond to magnetic foils configured to concentrate a field of electromagnetic flux generated by the induction coils 14 above the cooking surface 16. Additionally, each of the coil beam assemblies 26 may be manufactured identically or similarly but arranged in an alternating configuration, wherein adjacent odd columns 30a and even columns 30b are arranged rotated 180 degrees to each other.

In some embodiments, the foil structures 40 may comprise magnetically permeable material and be implemented as elongated, plasto-ferritic flexible foils 44 extending the length of the support beams 42. In this configuration, the plasto-ferritic foils 44 provide for a simple assembly in combination with the support beams 42, the induction coils 14 as additional components that may be incorporated in the coil beam assemblies 26. For example, in contrast with conventional induction cooktop assemblies that may utilize multiple sintered ferrite rigid bars or hexagonal single tile per induction coil, the assemblies 26 according to the invention may comprise the plasto-ferritic foils 44 extending under a string or linear array of the induction coils 14. For example, each string of the induction coils 14 in the assemblies 26 preferably comprises three to eight induction coils 14 or more in some embodiments. Accordingly, the plasto-ferritic foils 44 extending under a string of the induction coils 14 may provide for a monolithic component to be mounted beneath the induction coils 14 as opposed to multiple individual sintered ferrite bars or tiles.

The arrangement of the plasto-ferritic foils 44 may further provide for improved mechanical strength. For example, the extension of the unitary form of the plasto-ferritic foils 44 may have a semi-rigid structure that may serve to support the induction coils 14. That is, the semi-rigid structure of the plasto-ferritic foils 44 may limit the stress induced in the support beams 14 and thus limit the structural loads applied to the support beams 42. Finally, the plasto-ferritic foils 44 may be manufactured in significantly thin sheets having a substantially uniform thickness. For example, the thickness of the plasto-ferritic foils 44 may have a thickness of less than 4 mm while maintaining effective shielding of the electronic components of the cooktop 10.

As described herein, the term substantially may provide for some reasonable variation in dimensional properties and relationships among the various elements discuss herein. For example, the thickness of the foil structures 40 discussed herein may not be perfectly uniform due to various manufacturing variations that may result in inconsistencies in thickness. Accordingly, the thicknesses and other various dimensional aspects discussed herein may vary from approximately 2%-20% depending on the related tolerances that would reasonably be understood to those skilled in the related arts. The foil structure may be composed of a thermoplastic matrix and powder of ferrite.

Each of the coil beam assemblies 26 comprising the foil structures 40 and the beams 42 may further comprise an electrical circuit 46. The electrical circuit 46 may comprise a substrate that forms a printed circuit board (PCB). The PCB is configured to support a plurality of conductive connections of the electrical circuit 46. The electrical circuit is therefore implemented as a printed circuit board or a lead frame configured to communicate control signals and/or driving current from a controller. The electrical circuit 46 may comprise conductive traces in connection with conductive elements of each of the coils 14. The conductive traces of the electrical circuit 46 may be in communication with a controller of the cooktop assembly 10 via one or more connectors 48. The connectors 48 may form a connection interface with an inverter assembly or inverter array disposed in the housing 28 of the cooktop 10. The connectors 48 of the electrical circuit 46 may correspond to male, fast-connect terminals ("faston") configured to engage female receptacles 74 of the inverter assembly.

Still referring to FIGS. 2 and 3, the plasto-ferritic foils 44 may extend along the beams 42 forming the coil beam assemblies 26. The coil beam assemblies 26 may extend in complementary parallel groups beneath the cooking surface 16. In this configuration, the induction coils 14 supported by the beams 42 may be distributed over the cooking surface 16 in a matrix configuration. The beams 42 may be formed by a variety of structural materials (metal or composite). For example, the beams 42 may be formed of aluminum or fiber-reinforced plastic (FRP). In this configuration, the coil beam assemblies 26 provide for modular assemblies configured to be easily assembled within the housing 28 of the cooktop 10 forming the columns of the induction coils shown in FIG. 1.

In some embodiments, the plasto-ferritic foils 44 may be stacked such that each assembly 26 comprises a plurality of plasto-ferritic foils 44. As illustrated in the exemplary implementation shown in FIGS. 2 and 3, the assembly 26 may comprise a first plasto-ferritic foil 44a and a second plasto-ferritic foil 44b. The multilayered structure of plasto-ferritic foils does give to the designer a higher flexibility in choosing the desired thickness and shielding effect for each assembly 26. The ferrite material may be in the form of a particle or powder and may be a magnetically soft substance having a narrow magnetization cycle (e.g. manganese-zinc ferrite). In various embodiments, the material forming the foil structure 40 may have a relative magnetic permeability greater than 10.

The binder of the plasto-ferritic foils 44 may correspond to a variety of polymeric materials (e.g. polyurethane, polypropylene, polyester, polyphenylene sulfide (PPS), or silicone). Accordingly, the plasto-ferritic foils 44 may be molded or formed in a variety of ways. In this way, the plasto-ferritic foils 44 may be formed in various shapes and thicknesses to provide for the beneficial configurations discussed herein.

The individual induction coils 14 may be wound on coil formers 50. The coil formers 50 may be formed by plastic bobbins arranged over the plasto-ferritic foils 44 and may be configured to receive windings of the induction coils 14. In some embodiments, each induction coil 14 may be wound on one of the coil formers 50 having one or more plastic pins 52. The plastic pins 52 may extend from the coil formers 50 and be arranged to form corresponding mating assemblies with one or more apertures 54 formed in the plasto-ferritic foils 44 and/or the support beams 42. In this configuration, the pins 52 of the coil formers 50 may align the induction coils 14 with the plasto-ferritic foils 44 and/or the support beams 42 in the coil beam assemblies 26. Additionally, in some embodiments, the plastic pins 52 may provide for an electrically insulated path for one of more conductive elements of contacts to pass through the beam 42.

The electrical circuits 46 of the coil beam assemblies 26 may extend along the length of the support beams 42 comprising the induction coils 14. Accordingly, the electrical circuits 46 may be aligned with the conductive contacts of the induction coils 14. For example, in some embodiments, each of the coil beam assemblies 26 may share a single electrical circuit 46. Each of the electrical circuits 46 may correspond to a printed circuit board (PCB) or lead frame, which may be formed of a variety of materials. Some materials that may be utilized for the PCBs may include but are not limited to: FR-1, F4, FR-5, G-10, G-11, etc. Though specific materials are discussed herein in reference to various components of the cooktop 10, those skilled in the art will appreciate that other materials may be used.

The conductive traces of the electrical circuit 46 may be in communication with a controller of the cooktop assembly 10 via the connectors 48. The male connectors 48 are configured to form a connection interface 58 with a plurality of female connectors 74 of an inverter assembly or an inverter array. The inverter assembly for each of the coil beam assemblies 26 may be disposed in the housing 28 of the cooktop 10. The connection of the connectors 48 of the coil beam assemblies 26 in communication with the controller is further discussed in reference to FIGS. 4A and 4B.

In some embodiments, the coil beam assembly 26 may further comprise one of more spacers 60 disposed between the support beam 42 and the electrical circuit 46. The spacers 60 may be configured to provide for the electrical circuit 46 to mount to the support beam 42 in a spaced-apart configuration for electrical insulation purposes. In some embodiments, the coil beam assemblies 26 may further comprise a connection fixture 62 configured to align electrical connections of each of the free ends of the windings of the induction coils 14 to the electrical circuit 46. For example, the connection fixture 62 may be formed of plastic or other insulating materials and configured to snapably connect to apertures in the structure of the electrical circuit 46 via a plurality of engaging detents 64. In this configuration, the connection fixture 62 may be disposed between the support beam 42 and the electrical circuit 46 and configured to facilitate the insertion of the free ends of the conductive windings of the induction coils 14 into receiving terminals of the inverter assembly or inverter circuit. In this configuration, the coil beam assemblies 26 may be assembled easily and may further limit defects in manufacturing.

Referring now to FIGS. 4A and 4B, detailed assembly drawings of the coil beam assembly 26 are shown in exploded and assembled configurations with the inverter assembly 70. As previously discussed, in some embodiments, each of the coil beam assemblies 26 may form a quick-connection interface or connection interface 58 with the electrical circuits 46 or PCBs of the coil beam assemblies. As shown in FIG. 4B, the connection between the coil-beam assemblies 26 and the underlying inverters assemblies 70 may be realized by the connection interface 58 formed by the male connectors 48 of the electrical circuit 46 or the coil beam assembly 26 in connection with a plurality of female connectors 74 of the inverter assemblies 70. Though identified as male connectors in connection with the electrical circuit 46 and female connectors in connection with the inverter assemblies 70, it shall be understood that the configuration of the male connectors 48 and female connectors 74 may be swapped or otherwise configured to suit a desired application.

During assembly, the inverter assemblies 70 may be installed in the housing 28. With the inverter assemblies 70 installed, the coil beam assemblies 26 may be inserted into the housing 28 as well. The coil beam assemblies 26 may be aligned with the corresponding inverter assemblies 70 via an aligning feature 75 that may be formed by the female connectors 74 of the inverter assemblies 70. In some embodiments, the aligning feature may correspond to a trough form by an opening of the female connectors 74. An example of the aligning feature 75 is designated by broken lines demonstrating a path of a trough along the female connectors 74. In this configuration, the inverter assemblies 70 may be configured to receive the male connectors 48 of the coil beam assemblies 26 and align each of the alternating odd columns 30a and the even columns 30b such that the induction coils 14 are evenly spaced and aligned to form the array 12 as shown in FIG. 1. That is, the alignment of each of the beams 42 and the corresponding induction coils 14 may be facilitated by aligning the teeth of the male connectors 48 with the aligning feature 75 formed by the female connectors 74.

In the assembled configuration shown in FIG. 4B, the conductive traces of the electrical circuit 46 may be in communication with a controller of the cooktop assembly 10 via the inverter assembly 70. The inverter assemblies 70 may comprise one or more driving circuits configured to generate one or more high frequency switching signals. The switching signals may cause the induction coils 14 to generate the electromagnetic field in one or more cooking utensils 22 on the cooking surface 16. In this way, the disclosure may provide for an improved apparatus and assemblies to improve both the performance and economy of the cooktop 10.

Referring now to FIGS. 3, 4A, and 4B, in some embodiments the electrical circuits 46 (e.g. PCBs) may form integrated components of the coil beam assemblies 26. In such an arrangement, free ends of the windings of the induction coils 14 may be soldered directly to the electrical circuits 46. The conductive traces of the electrical circuits 46 may then be connected directly to the inverter assemblies 70 underlying the coil beam assemblies 26 via the connection interface 58. In some embodiments, the conductive traces of the PCB or the electrical circuit 46 may be connected or soldered to multi-wire flat cables connected or soldered, on an opposing end, to the inverter assemblies 70.

In some embodiments, the induction coils 14 may comprise one or more temperature sensors 76. In various embodiments, the temperatures sensors 76 may correspond to a negative temperature coefficient (NTC) sensor configured to adjust a resistance based on a temperature proximate to the sensor 76. The temperature sensors 76 may comprise one or more conductive wires or leads 78, 106 that may be connected to the controller via the electrical circuits 46 and the inverter assemblies 70.

In operation, the temperature sensors 76 may communicate temperature signals for one or more of the induction coils 14 that are utilized by the controller for temperature control and regulation purposes. Accordingly, in various embodiments, the connection interface 58 may further be configured to pass signals (e.g. a temperature signal) from the conductive wires 78, 106 of the temperature sensors 76. In this configuration, each of the assemblies 26 may be electrically or conductively connected to the inverter assemblies and the controller of the cooktop assembly 10 via the connection interface 58 providing for efficient assembly and improved quality in manufacturing the cooktop assembly 10.

As demonstrated in FIG. 4B, in the assembled configuration the coil beam assemblies 26 may mount to the inverter assembly 70 via the connection interface 58. The inverter assembly 70 may be mounted within the housing 28, thereby securing each of the coil beam assemblies 26 to the housing 28. Additionally, as later discussed in reference to FIGS. 5A and 5B, the coil beam assemblies 26 may be supported by the first wall 28a and the second wall 28b of the housing 28 or burner box of the cooktop 10. Accordingly, the coil beam assemblies may extend from the first wall 28a on a first side of the housing 28 to the second wall 28b arranged on opposite sides of the housing 28.

In the assembled configuration, the coil beam assembly 26 extends over a span extending between the first wall 28a and the second wall 28b forming an opening between a lower surface 26a of the beam assembly 26 and an upper surface 70b of the inverter assembly 70. A top surface 26b of the coil beam assembly 26 and a bottom surface 70a of the inverter assembly 70 are shown. In this configuration, the inverter assembly 70 may be separated from the coil beam assembly 26 such that cooling air may dissipate heat generated by each of the inverter assemblies 70. For example, each of the inverter assemblies 70 may be arranged in parallel beneath the alternating odd columns 30a and the even columns 30b of the induction coils 14. In this configuration, a plurality of ventilation paths 80 (FIG. 4A) may extend in parallel between each of the corresponding inverter assemblies 70 and coil beam assemblies 26 providing cooling for the inverter assemblies 70 and other electrical components in the housing 28. Though the assemblies 26 are discussed as columns 30a and 30b, the elongated structures forming the assemblies 26 may be arranged as rows, diagonals, or various spatial orientations.

Referring now to FIGS. 5A and 5B, a side, cross-sectional view of the cooktop assembly 10 is shown. As shown, when assembled in the cooktop assembly, a top surface 14a (opposite a bottom surface 14b) of each of the inductors 14 may contact a bottom surface 90a of a panel 90 that forms the cooking surface 16. In order to ensure that the temperature sensors 76 and the inductors 14 maintain contact with the bottom surface 90a (opposite a top surface 90b) of the panel 90, the cooktop assembly 10 may comprise one or more spring assemblies 92. The spring assemblies 92 may be disposed in the coil beam assemblies 26, the housing 28, and/or as one or more intervening assemblies interconnecting the coil beam assemblies 26, the housing 28, and the panel 90. The spring assemblies 92 may provide a spring biased adjustment that may alleviate issues related to dimensional variation in various components of the cooktop assembly 10 and improve the resiliency of cooktop assembly 10 to forces applied particularly during transport and installation.

In an exemplary embodiment, each of the beams 42 of the coil beam assemblies 26 may comprise a plurality of peripheral ends (e.g. a first end portion 42a and a second end portion 42b). The end portions 42a and 42b of the beam assembly 26 may be supported by the spring assemblies 92. As previously discussed, the beams 42 may be cut and formed from aluminum or other structural materials. In this configuration, the peripheral ends 42a and 42b of each beam 42 may rest on a peripheral rim 94 of the underlying housing 28. The peripheral rim 94 of the housing 28 may comprise the spring assemblies 92, which may be implemented as cantilevered support springs 96 extending into the housing 28. The support spring 96 may be configured to couple the end portions 42a and 42b of the beam assembly 42 to the peripheral rim 94. In this configuration, the support springs 96 may couple the beam assemblies 26 to the housing 28 while allowing the coil beam assemblies 26 to adjust vertically as indicated by the directional arrow 98.

The support springs 96 may provide various advantages to the structural arrangement of the cooktop assembly 10. For example, in order to ensure effective operation of each of the induction coils 14 and the temperature sensors 76, these elements should maintain contact or specific spacing from the bottom surface 90a of the panel 90 that forms the cooking surface 16. The support springs 96 may allow each of the coil beam assemblies 26 to be displaced vertically such that the induction coils 14 and the temperature sensors 76 are pressed against the bottom surface 90a by a spring force applied by each of the support springs 96. In general, the support springs 96 may correspond to spring mechanisms configured to be displaced from approximately 1 mm to 5 mm. In this way, the cooktop assembly 10 may be designed to ensure that the inductors 14 maintain contact with the panel 90 in spite of limitations related to manufacturing and assembly tolerances. Additionally, the support springs 96 may allow the coil beam assemblies 26 to shift due to forces applied during transport or use of the cooktop assembly 10 thereby improving the resiliency and durability of the assembly 10.

In an exemplary embodiment, the support springs 96 may be stamped or cut-out from a metal material utilized to construct the housing 28. For example, the spring supports 96 may be stamped from the peripheral rim 94 of the housing 28. The spring supports 96 may be formed as finger-shaped spring elements, which may be cutout or stamped into the material of the housing 28 during the manufacture of the housing 28. The spring supports 96 may be supported at a first end portion 96a and extend from the housing 28 to a second end portion 96b. Between the first end portion 96a and the second end portion 96b a u-shaped loop 96c may be formed from the material of the housing 28. In this configuration, the end portions 42a and 42b of the beam assembly 42 may rest on the spring elements 96, which may further be supported by the peripheral rim 94 and the corresponding first wall 28a and the second wall 28b of the housing 28. In this configuration, the spring force of the spring elements 96 may maintain contact between the top panel 90 and each of the inductors 14 and the temperature sensors 76.

In some embodiments, the support springs 96 may be formed from a shelf or a perimeter frame 100 disposed on top of the housing 28. The perimeter frame 100 may be composed of a material similar to that of the housing 28 and be configured to mate with and rest on the peripheral rim 94 of the housing 28. In such embodiments, the support springs 96 may be stamped or cut-out from a material utilized to construct the housing perimeter frame 100. In such embodiments, the spring supports 96 may be formed as finger-shaped spring elements, which may be supported at the first end portion 96a and extend from the perimeter frame 100 to a second end portion 96b in connection with the support beam 42. Between the first end portion 96a and the second end portion 96b the u-shaped loop 96c may be formed from the material of the perimeter frame 100. As may be apparent, the perimeter frame may accordingly correspond to an optional assembly incorporating the support springs 96 that may be incorporated or integrated into the housing 28 depending on the desired manufacturing or assembly criteria.

Figure 6A:
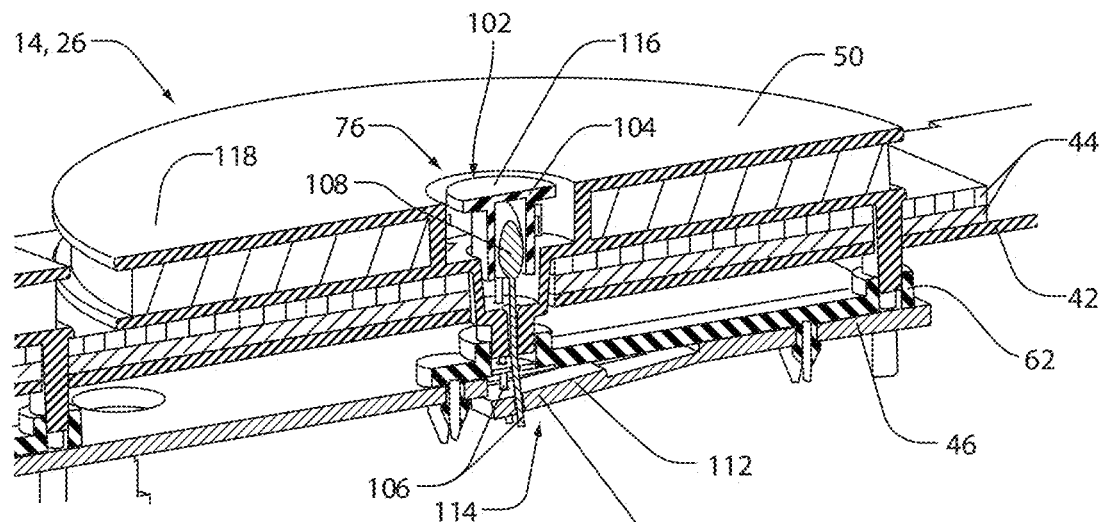
FIG. 6A is a detailed, projected cross-section view of the coil beam assembly along section line II-II of FIG. 2 showing a spring assembly for a temperature sensor.
Figure 6B:
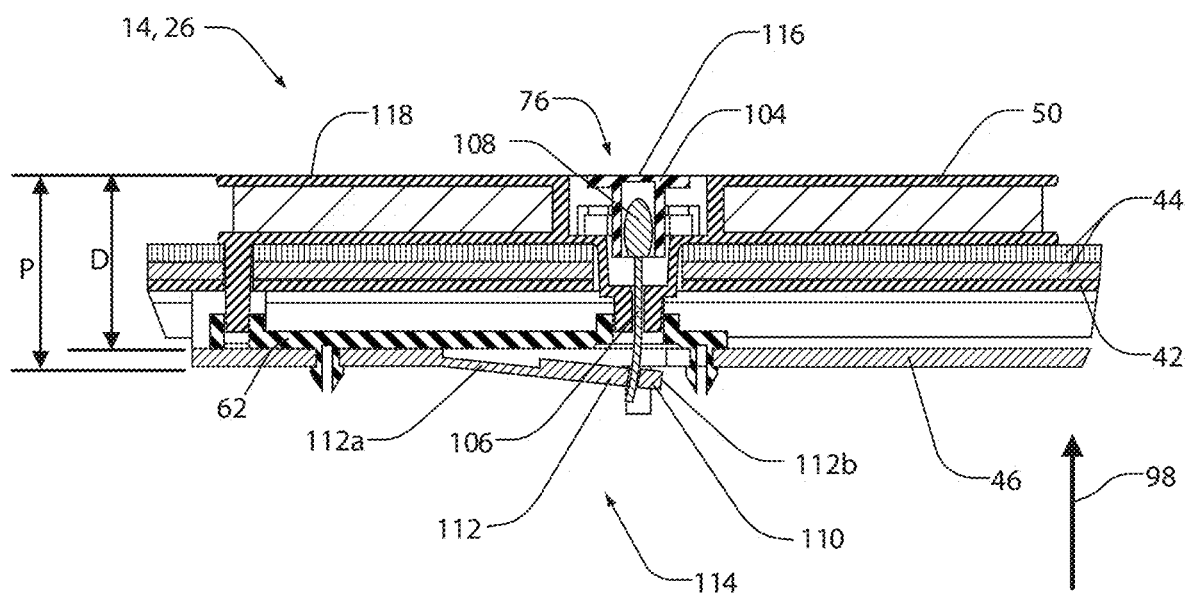
FIG. 6B is a detailed, side cross-section view of the coil beam assembly of FIG. 6A.

Referring to FIGS. 6A and 6B, side cross-sectional views of an induction coil 14 of the coil beam assembly 26 are shown sectioned along line II-II of FIG. 2. The temperature sensor 76 is disposed in an opening 102 formed centrally in the coil former 50 of the induction coil 14. The temperature sensor 76 may be disposed in a heat conducting sheath 104, which may be configured to translate within the opening 102. Additionally, the temperature sensor 76 may comprise electrically conductive connections 106 that extend from a sensor body 108 disposed in a cavity formed in the sheath 104. The conductive connections 106 may extend through the opening 102 in the coil former 50, through the apertures 54 in the plasto-ferritic foil(s) 44 and the support beams 42, and conductively connect to a terminal 110 of the electrical circuit 46. In this configuration, the temperature sensors 76 may detect and communicate temperature signals to a controller of the cooktop assembly 10 to monitor and control operating conditions local to one or more of the induction coils 14.

In order to ensure that the temperature sensors 76 disposed in the inductors 14 maintain contact with the panel 90, the cooktop assembly 10 may comprise additional or alternative spring assemblies 92. As shown in FIG. 6A, the electrical circuit 46, which corresponds preferably to a printed circuit board (PCB), forms an integral cantilevered spring 112. The cantilevered spring 112 may be formed by selectively milling the PCB material of the electrical circuit 46. In this configuration, the terminal 110 of the electrical circuit 46 may be formed on a peninsula 114 formed by an opening milled or otherwise removed from the PCB material of the electrical circuit 46. Though described as being milled from the electrical circuit 46, the spring supporting the temperature sensor 76 may be implemented as one or more spacers or spring tabs that may be disposed between the beam 42 and the electrical circuit 46.

As shown in FIG. 6B corresponding to an installed configuration, a sensor contact surface 116 of the sheath 104 may be spaced at a probe distance P relative to the electrical circuit 46. The probe distance P may be slightly greater than a set distance D between the electrical circuit 46 and a coil contact surface 118. As illustrated, the increased probe distance P may result in the bottom surface 90a of the panel 90 applying a force on the sensor contact surface 116. The force applied by the bottom surface 90a may cause the heat conducting sheath 104 and additional components of the temperature sensor 76 to translate toward the electrical circuit 46.

As a result of the dimensions of the probe distance P to the set distance D, the cantilevered spring 112 may deflect away from the bottom surface 90a (configuration shown in FIGS. 6A and 6B) thereby causing a spring force of the cantilevered spring 112 to apply pressure back toward the panel 90. Accordingly, in an assembled configuration, the cantilevered spring 112 may be configured to position the contact surface 116 of the temperature sensor 76 such that the contact surface 116 translates slightly as a result of assembling the panel 90 to the cooktop assembly 10. Such translation, which prompts a deflection of the cantilevered spring 112, may provide for the temperature sensors 76 to remain in contact with the bottom surface 90a of the panel 90 even if there are substantial variations in the positioning of the temperature sensors 76 vertical along the directional arrow 98. Accordingly, the cantilever spring 112 may provide for improved assembly quality as well as the reduction of the stress on the temperature sensor 76 that may otherwise collapse under the vertical force applied by the panel 90. In a different embodiment (not shown in the drawings), the springs may be elastic lamellas attached to the PCB.

Figure 7:
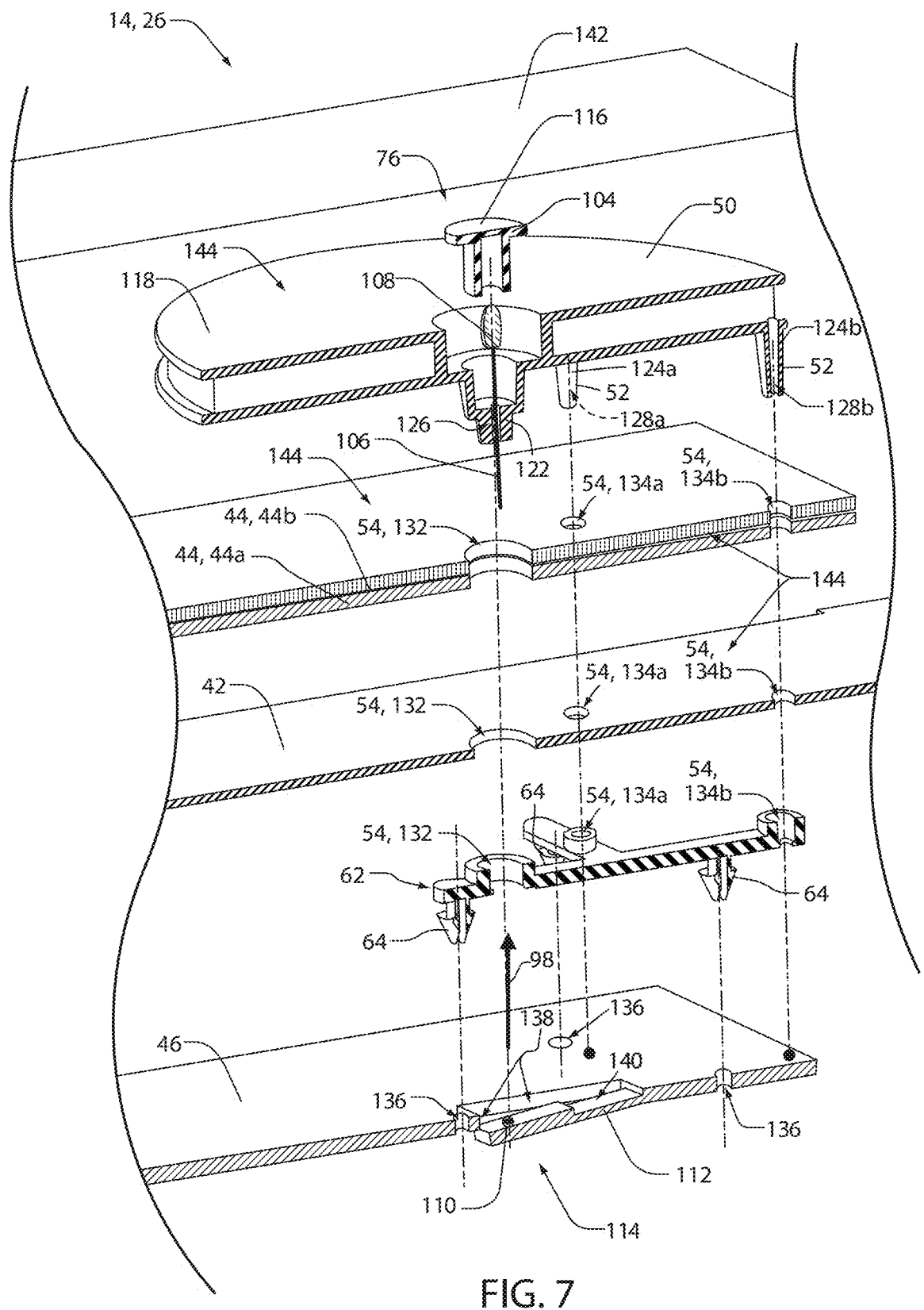
FIG. 7 is a projected exploded view of a coil beam assembly of the induction cooktop of FIG. 1.

Referring now to FIG. 7, an exploded, cross-sectional assembly view of the beam coil assembly 26 is shown sectioned along line II-II of FIG. 2. The exploded view may demonstrate further details of a stacked configuration of the assembly 26. Beginning at the top of the assembly 26, the sensor body 108 of the temperature sensor 76 is shown separated from the sheath 104. The sheath 104 may be configured to receive the temperature sensor 76 in an assembled configuration. Additionally, the sheath may be configured to translate upward and downward in the opening 102 formed centrally in the coil former 50 of the induction coil 14. The temperature sensor 76 comprises the electrically conductive connections 106 configured to extend from the sheath 104 and into the opening 102 formed in the coil former 50, through the plasto-ferritic foil(s) 44, and through the support beam 42. The conductive connections 106 further connect to the cantilevered spring 112 formed in the PCB of the electrical circuit 46.

The windings of the induction coil 14 are shown wound on the coil former 50, the details of which are further discussed in reference to FIGS. 8A and 8B. The coil formers 50 may be formed by spindles or bobbins arranged over the plasto-ferritic foils 44. The coil formers may be configured to receive windings of the induction coils 14. The coil formers 50 may comprise the one or more plastic pins 52. The plastic pins 52 may comprise a central pin 122, an inner pin 124a placed close to the central pin 122, and a peripheral pin 124b. The pins 52 may extend from the coil formers 50 and be arranged to form corresponding mating assemblies with the one or more apertures 54 formed in the plasto-ferritic foils 44 and/or the support beams 42. In this configuration, the pins 52 of the coil formers 50 may align the induction coils 14 with the plasto-ferritic foils 44 and/or the support beams 42 in the coil beam assemblies 26.

Each of the pins 52 forms interior passages, which may be configured to pass one or more conductive connectors from the windings of the induction coils 14 and/or the connection to the temperature sensor 76. In an exemplary embodiment, the conductive connection 106 from the temperature sensor 76 may pass through a central passage 126 formed in the central pin 122 of the coil former 50. Additionally, a first and second free end of the conductive windings of the induction coil 14 may pass through a peripheral passage 128b formed through the peripheral pin 124b and through an inner passage 128a formed through the inner pin 124a respectively. In this configuration, the coil former 50 may provide for insulated passages for each of the conductive wires for the induction coil 14 and the temperature sensor 76.

Additionally, the pins 52 of the coil former 50 may form corresponding mating assemblies with the one or more apertures 54 formed through the plasto-ferritic foils 44, the support beams 42, and/or the connection fixture 62. For example, an exterior profile of the central pin 122 may align with a central pin aperture 132 extending through the plasto-ferritic foils 44, the support beams 42, and the connection fixture 62. Additionally, an exterior profile of each of the inner and peripheral pin 124a, 124b may align with a corresponding peripheral pin aperture 134b formed through the plasto-ferritic foils 44, the support beams 42, and/or the connection fixture 62. In a similar manner, an exterior profile of the inner pin 124a may align with a corresponding inner pin aperture 134a formed through the plasto-ferritic foils 44, the support beam 42, and/or the connection fixture 62. In this configuration, each of the coil formers 50, the plasto-ferritic foils 44, the support beams 42, and the connection fixtures 52 may be simply and accurately aligned to assemble each of the coil beam assemblies 26.

The connection fixture 62 may further be configured to connect and align the coil formers 50, the plasto-ferritic foils 44, and the support beams 42 with the electrical circuit 46. For example, the connection fixture 62 may be formed of plastic or other insulating materials and comprise a plurality of engaging detents 64 extending downward opposite the induction coils 14. In this configuration, the engaging detents 64 may be aligned with a plurality of fixture apertures 136 formed in the structure (e.g. PCB material) of the electrical circuit 46. Accordingly, the engaging detents 64 may snapably engage the electrical circuit 46 to ensure accurate assembly of the coil beam assemblies 26. The connection fixture 62 may also guide the conductive connections of the windings of the induction coils 14 and the temperatures sensor 76 into receiving terminals of the electrical circuit 46.

In some embodiments, the plasto-ferritic foils 44 may be stacked such that each assembly 26 comprises a plurality of plasto-ferritic foils 44. As illustrated in FIG. 7, the assembly 26 may comprise a first plasto-ferritic foil 44a and a second plasto-ferritic foil 44b. Each of the plasto-ferritic foils 44 may be formed by mixing a ferrite powder with a flexible binder or by ribbons of nanocrystalline magnetic alloy. Each of the plasto-ferritic foils 44 may be molded or formed in a variety of ways. In this way, the plasto-ferritic foils 44 may be formed in various shapes and thicknesses to provide for the beneficial configurations discussed herein.

The electrical circuit 46 may extend along the length of the support beams 42. In some embodiments, each of the induction coils 14 on one of the coil beam assemblies 26 may share a single electrical circuit 46. Each of the electrical circuits 46 may correspond to one or more printed circuit boards (PCB) or lead frames, which may be formed of a variety of materials. The conductive traces and connectors 48 of the electrical circuit 46 are not shown in FIG. 7 for sake of clarity.

As previously discussed, the electrical circuit 46 may comprise one of the spring assemblies 112 discussed herein. The electrical circuit 46, which corresponds to a printed circuit board (PCB), forms the cantilevered spring 112. In the drawings the cantilevered spring 112 is shown in the active configuration, i.e. when it is deflected and acts elastically on the temperature sensor 76. In an idle configuration (not shown in the drawings), the cantilevered spring 112 is flush with the remaining portion of the PCB. The cantilevered spring 112 may be formed by selectively cutting and/or milling the PCB material of the electrical circuit 46. For example, a slot or opening 138 may be formed around three sides of the peninsula 114. Additionally, a relief portion 140 may be formed in the material of the PCB forming the electrical circuit 46. The relief portion 140 may be configured to provide a desired spring force exerted from a proximal end portion 112a to a distal end portion 112b of the cantilevered spring 112. In this configuration, the terminal 110 of the electrical circuit 46 may be formed on a peninsula 114, which is formed by an opening milled or otherwise removed from the PCB material of the electrical circuit 46.

In an assembled configuration, the cantilevered spring 112 may be configured to position the contact surface 116 of the temperature sensor 76 such that the contact surface 116 deflects slightly as a result of assembling the panel 90 to the cooktop assembly 10. The deflection may provide for the temperature sensors 76 to remain in contact with the bottom surface 90a of the panel 90 even if there are substantial variations in the positioning of the temperature sensors 76 vertical along the directional arrow 98. Accordingly, the cantilever spring 26 may provide for improved assembly quality as well as the reduction of the stress on the temperature sensor 76 that may otherwise collapse under the vertical force applied by the panel 90.

In some embodiments, an insulating foil 142 may be disposed between the induction coils 14 and the panel 90. The insulating foil 142 may be formed by a thin thermally and/or electrically insulating material such as a polymeric film. The coil beam assembly 26 may further comprise one or more adhesive layers 144 disposed between one or more of the coil formers 50, the plasto-ferritic foils 44, the support beams 42, the connection fixtures 52, and the electrical circuit 46. Accordingly, the individual component layers of the coil beam assembly 26 may be combined in various embodiments based on ease of assembly, durability, or various other aspects that may improve the design of the cooktop assembly 10.

In some embodiments, one or more of the layers may be co-molded with the coil formers 50 and/or the plasto-ferritic foils 44. For example, the plasto-ferritic foils 44 may be manufactured via a thermoforming or molding or calendering or extruding process wherein a polymeric material is molded to form the foil structure. Accordingly, in some embodiments, the first plasto-ferritic foil 44a may be molded to the coil former 50 to form an integrated assembly. Additionally, the second plasto-ferritic foil 44b may be molded to the beam 42. In some embodiments, the connection fixture 62 may additionally be molded to the electrical circuit 46. Accordingly, one or more of the discrete layers discussed herein may be merged to form composite structures. The composite structures may be formed by co-molding of any of the aforementioned stacked layers, into integral assemblies.

Referring now to FIGS. 8A and 8B, embodiments of the coil formers 50 of the induction coils 14 are shown. As previously discussed, each of the individual induction coils 14 may be wound on the coil formers 50. The coil formers 50 may be formed of an insulating material (e.g. polymer, etc.) and arranged over the plasto-ferritic foils 44. The coil formers 50 may be configured in various configurations including a spindle configuration 50a shown in FIG. 8A and a bobbin configuration 50b shown in FIG. 8B. The coil formers 50 may be configured to receive the conductive windings of the induction coils 14 wound around a central shaft 152. In this configuration, the coil formers 50 may provide for the induction coils 14 to be easily assembled to the coil beam assembly 26.

Referring to FIGS. 7, 8A, and 8B, each of the exemplary coil former configurations 50*a* and 50*b* are now discussed first focusing on similarities. Accordingly, like reference numerals are utilized to designate like components. In various embodiments, the coil formers 50 may comprise a notch or aperture 154 formed in the central shaft 152. In this configuration, a first free end of the conductive winding may pass through the notch or aperture 154 or aperture and into the inner passage 134*a* formed in the inner pin 124*a* of the coil former 50. In this way, the first free end of the winding may pass through a base 156 of the coil former 50. Additionally, the notch or aperture 154 may serve as a catch for the winding during a wrapping or coiling process.

A second free end of the conductive windings of the induction coil 14 may pass through a peripheral passage 128*b* formed in the peripheral pin 124*b* of the coil former 50. In this configuration, the coil former 50 may provide for a discrete assembly that may be conveniently assembled to the coil beam assembly 26. For example, the windings of the induction coil 14 may be wound or coupled to the coil former 50 initially. Once coiled, the coil former 50 and the windings may be added to the coil beam assembly 26 utilizing the passages 128*a* and 128*b* to pass the free ends of the windings to the electrical circuit 46.

The windings of the induction coils may correspond to various forms of conductive wire, preferably electrically insulated, and, in an exemplary embodiment, may correspond to Litz wire. The windings of the induction coil 14 are not shown in the drawings to clearly demonstrate details of the coil formers 50 and other aspects of the assemblies 26. The windings may be wrapped around the central shaft 152 and overlap in a tightly wrapped configuration. The windings may extend outward wrapping around the central shaft 152 and terminating with a second free end at a coil perimeter 158, which may extend proximate to a radial perimeter 160 of the induction coil 14.

Referring to FIG. 8A, the spindle configuration 50*a* of the coil former 50 is shown demonstrating an open configuration. The spindle configuration 50*a* may comprise the base 156 and the central shaft 152 with an open upper portion 162. The open upper portion 162 may provide for the windings of the induction coil 14 to be exposed. Such an arrangement may limit the thickness of the coil former 50 and consequently also limit the thickness of the coil beam assembly 26. The open upper portion 162 of the spindle configuration 50*a* may be implemented in combination with the thermally and/or electrically insulating foil 142 forming a top surface of the inductor 14. The insulating foil 142 may be disposed between the remaining elements of the coil beam assembly 26 and the top panel 90.

Referring to FIG. 8B, the bobbin configuration 50*b* of the coil former 50 is shown demonstrating a closed configuration. The bobbin configuration 50*b* may comprise the base 156 and the central shaft 152 with an upper portion 164. The upper portion 164 may extend radially from the central shaft substantially coextensive to the base 156. In this configuration, the bobbin configuration 50*b* may provide for the windings of the induction coil 14 to be substantially enclosed in between the base 156 and the upper portion 164. In this arrangement, the coil former 50 may serve as a winding guide 166 formed as a trough between the base 156 and the upper portion 164. The bobbin configuration 50*b* may also be implemented in combination with the thermally and/or electrically insulating foil 142 forming a top surface of the inductor 14. The insulating foil 142 may be disposed between the remaining elements of the coil beam assembly 26 and the top panel 90. In each of the embodiments and in case the conductive wire is not provided with an electrically insulated coating, the coil formers 50 may act as insulating bodies preventing the conduction of electrical current in the conductive winding from being transmitted into additional portions of the coil beam assembly 26 (e.g. the plasto-ferritic foils 44 and the support beam 42).

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present invention. Other substitutions, modifications, changes, and omissions may be made in the design, operating conditions, and arrangement of the desired and other exemplary embodiments without departing from the technical teaching of the present invention.

What is claimed is:

1. An induction cooking apparatus comprising: a panel forming a cooking surface and a bottom surface, the cooking surface configured to support a cooking utensil; a housing in connection with and disposed beneath the cooking surface, the housing forming an enclosure having an internal cavity, the enclosure comprising a first side and a second side opposite the first side; a plurality of induction coils arranged in at least one linear array beneath the cooking surface; a beam structure comprising a first end portion and a second end portion, wherein the beam structure is configured to extend across the housing of the cooking apparatus from the first side to the second side and supports the plurality of induction coils; a perimeter frame disposed on a peripheral rim formed by the first side and the second side of the housing; at least one temperature sensor adjacent the bottom surface of the panel; a plurality of spring mechanisms connecting the first end portion to the first side and the second end portion to the second side, wherein the spring mechanisms are formed from the perimeter frame as protruding spring elements aligned with the linear array of induction coils; and an electrical circuit comprising a substrate in connection with the beam structure, wherein the electrical circuit comprises a temperature sensor spring formed by an opening in the substrate, wherein the temperature sensor spring deflects away from the bottom surface, such that the at least one temperature sensor is positioned in contact with the bottom surface.

2. The cooking apparatus according to claim 1, wherein the spring mechanisms suspend the beam structure and the plurality of induction coils in the enclosure.

3. The cooking apparatus according to claim 1, wherein the spring mechanisms apply a spring force on the first end portion and the second end portion of the beam structure.

4. The cooking apparatus according to claim 3, wherein the spring force presses one or more of the induction coils in contact with the bottom surface of the panel.

5. The cooking apparatus according to claim 1, wherein the housing forms the peripheral rim in connection with the panel.

6. The cooking apparatus according to claim 5, wherein the spring mechanisms are positioned and aligned along the first side and the second side of the peripheral rim as protruding spring elements.

7. The cooking apparatus according to claim 5, wherein the position and alignment of the spring mechanisms align the linear array of induction coils in the housing extending from the first side to the second side.

8. The cooking apparatus according to claim 1, further comprising a plurality of linear arrays each supported by a beam structure.

9. The cooking apparatus according to claim 8, wherein the plurality of linear arrays extend adjacently from the first side to the second side forming a matrix of induction coils.

10. The cooking apparatus according to claim 1, wherein the spring mechanisms form a first spring end extending from the housing interconnected by a curved portion to a second spring end, the second spring end extending into the enclosure.

11. The cooking apparatus according to claim 10, wherein a first spring mechanism of the plurality of spring mechanisms comprises the second spring end in connection with the first end portion of the beam structure on the first side and a second spring mechanism of the plurality of spring mechanisms comprises the second spring end in connection with the second end portion of the beam structure on the second side.

12. The cooking apparatus according to claim 11, wherein the second spring end and the curved portion are configured to be displaced 1 mm to 5 mm in response to a force applied by the bottom surface of the panel to one or more of the induction coils resulting in a spring force applied by the spring mechanisms to the first end portion and the second end portion of the beam structure.

13. The cooking apparatus according to claim 1, wherein a perimeter frame forms a shelf extending at least partially into the enclosure.

14. An induction cooking apparatus comprising: a panel forming a cooking surface and a bottom surface, the cooking surface configured to support a cooking utensil; a housing in connection with and disposed beneath the cooking surface, the housing forming an enclosure having an internal cavity, the enclosure comprising a first side and a second side opposite the first side; a plurality of induction coils arranged in a linear array beneath the cooking surface; a beam structure comprising a first end portion and a second end portion and configured to extend across the housing of the cooking apparatus from the first side to the second side, wherein the beam structure is configured to support the linear array of induction coils; at least one temperature sensor adjacent the bottom surface of the panel; a plurality of spring mechanisms connecting the first end portion to the first side and the second end portion to the second side, wherein the beam structure and the plurality of induction coils are suspended from the spring mechanisms in the enclosure; an electrical circuit comprising a substrate in connection with the beam structure, wherein the electrical circuit comprises a spring portion in connection with the at least one temperature sensor and formed by the spring portion of the substrate, wherein the spring portion comprises having an opening formed through the substrate at least partially around the spring portion such that the spring portion deflects relative to the substrate; and wherein the electrical circuit is held in connection with the bottom surface by the plurality of spring mechanisms and the portion of the substrate forming the temperature sensor spring deflects away from the bottom surface, such that the at least one temperature sensor is positioned in contact with the bottom surface.

15. The apparatus according to claim 14, wherein the spring mechanisms apply a spring force on the first end portion and the second end portion of the beam structure.

16. The apparatus according to claim 15, wherein the spring force presses one or more of the induction coils in contact with the bottom surface of the panel.

17. The apparatus according to claim 14, wherein the housing forms a peripheral rim in connection with the panel.

18. The apparatus according to claim 17, wherein the spring mechanisms are positioned and aligned along the first side and the second side of the peripheral rim as protruding spring elements positioning the linear array of induction coils in the housing.

19. An induction cooking apparatus comprising:
a panel forming a cooking surface and a bottom surface, the cooking surface configured to support a cooking utensil;
a housing in connection with and disposed beneath the cooking surface, the housing forming an enclosure having an internal cavity, the enclosure comprising a first side and a second side opposite the first side;
at least one temperature sensor adjacent the bottom surface of the panel;
a beam structure extends across the housing of the cooking apparatus from the first side to the second side and supports at least one induction coil;
a plurality of first spring mechanisms supporting the beam structure from the first side to the second side; and
an electrical circuit comprising a substrate in connection with the support beam and in communication with the induction coil and the temperature sensor, wherein the electrical circuit comprises a second spring mechanism formed by the substrate and wherein the second spring mechanism is in connection with the temperature sensor.

20. The induction cooking apparatus according to claim 19, wherein the electrical circuit is held in connection with the bottom surface by the plurality of first spring mechanisms and the at least one temperature sensor is flexibly positioned in contact with the bottom surface relative to the substrate by the second spring mechanism.

\* \* \* \* \*